(12) United States Patent
Lee

(10) Patent No.: US 11,131,870 B2
(45) Date of Patent: Sep. 28, 2021

(54) THERMOCHROMIC DISPLAY WITH CONDUCTIVE STRUCTURES

(71) Applicant: Lintec of America, Inc., Richardson, TX (US)

(72) Inventor: Jaeah Lee, Richardson, TX (US)

(73) Assignee: LINTEC OF AMERICA, INC., Richardson, TX (US)

( * ) Notice: Subject to any disclaimer, the term of this patent is extended or adjusted under 35 U.S.C. 154(b) by 266 days.

(21) Appl. No.: 16/364,974

(22) Filed: Mar. 26, 2019

(65) Prior Publication Data

US 2019/0346703 A1    Nov. 14, 2019

Related U.S. Application Data

(60) Provisional application No. 62/669,624, filed on May 10, 2018.

(51) Int. Cl.
*G02F 1/01* (2006.01)

(52) U.S. Cl.
CPC ...... *G02F 1/0147* (2013.01); *G02F 2202/022* (2013.01); *G02F 2202/04* (2013.01); *G02F 2202/28* (2013.01); *G02F 2202/36* (2013.01)

(58) Field of Classification Search
CPC .... G02F 1/0147; G02F 1/01; G02F 2202/022; G02F 2202/04; G02F 2202/28; G02F 2202/36

USPC ........................................................ 359/288
See application file for complete search history.

(56) References Cited

U.S. PATENT DOCUMENTS

| | | | |
|---|---|---|---|
| 8,921,473 B1 * | 12/2014 | Hyman | C08K 3/04 |
| | | | 524/445 |
| 9,823,737 B2 * | 11/2017 | Mazed | G06F 3/013 |
| 2014/0177029 A1 | 6/2014 | Liu et al. | |
| 2017/0137290 A1 | 5/2017 | Zhang et al. | |
| 2018/0067352 A1 | 3/2018 | Pellerite et al. | |

OTHER PUBLICATIONS

International Search Report and Written Opinion received for PCT/US2019/024044, dated May 30, 2019. 11 pages.

\* cited by examiner

*Primary Examiner* — William R Alexander
(74) *Attorney, Agent, or Firm* — Greenblum & Bernstein, P.L.C.

(57) ABSTRACT

Thermochromic displays that accomplish a thermochromic transition in less than 100 milliseconds are described. This rapid response time is accomplished by including conductive structures within the thermochromic display and placing the conductive structures in direct contact with and/or proximate to a thermochromic layer. The conductive structures can be disposed between the thermochromic layer and a film that carries the message to be produced. Because of the high thermal conductivity of the conductive structures, heat can be conducted to and/or conducted away from the thermochromic layer much more rapidly than in the absence of conductive structures.

22 Claims, 6 Drawing Sheets

Nanofiber forest

Example reactor for growing nanofibers

THERMOCHROMIC DISPLAY WITH CONDUCTIVE STRUCTURES

TECHNICAL FIELD

The present disclosure relates generally to thermochromic displays. Specifically, the present disclosure is directed to thermochromic displays with conductive structures.

BACKGROUND

Temperature sensitive labels or indicators that change color and/or opacity (alternatively, transparency) upon a change in temperature have many practical applications. In some cases, thermochromic materials such as polymers (e.g., liquid crystal polymers) and/or pigments (e.g., leuco dyes) are fabricated into a thermochromic layer. This thermochromic layer can be applied to an underlying surface. As the underlying surface changes temperature, the thermochromic layer changes color or transitions to its alternative transparent (or opaque) state. The color of the thermochromic layer can itself be an indicator of the temperature of the underlying surface.

SUMMARY

Example 1 is an apparatus comprising a message film comprising a substrate and at least one of a text or an image on the substrate; a thermochromic layer comprising a thermochromic material; and a plurality of carbon nanofiber structures between the message film and the thermochromic layer and in contact with the thermochromic layer.

Example 2 includes the subject matter of Example 1, wherein the thermochromic layer comprises liquid crystal polymer.

Example 3 includes the subject matter of Example 1, wherein the thermochromic layer comprises a leuco dye.

Example 4 includes the subject matter of any of the preceding Examples, wherein the plurality of carbon nanofiber structures comprises an array of linearly arranged carbon nanofibers.

Example 5 includes the subject matter of Example 4, further comprising at least one carbon nanofiber yarn in electrical contact with each linearly arranged carbon nanofiber of the array.

Example 6 includes the subject matter of any of the preceding Examples, wherein the plurality of carbon nanofiber structures comprises a grid of transversely arranged carbon nanofiber yarns.

Example 7 includes the subject matter of any of Examples 4-6, wherein a pitch between adjacent carbon nanofiber yarns is from 100 µm to 1 mm.

Example 8 includes the subject matter of any of the preceding Examples, wherein the carbon nanofiber structures of the plurality are single ply carbon nanofiber yarns.

Example 9 includes the subject matter of any of Examples 1-7, wherein the carbon nanofiber structures of the plurality are multi-ply carbon nanofiber yarns.

Example 10 includes the subject matter of any of the preceding Examples, further comprising an electrode in contact with at least one carbon nanofiber yarn of the plurality.

Example 11 includes the subject matter of any of the preceding Examples, wherein a thermal conductivity of the plurality of carbon nanofiber structures transports heat from a heat source to the thermochromic layer in less than 100 milliseconds.

Example 12 includes the subject matter of any of the preceding Examples, further comprising a second material disposed within the carbon nanofiber structures of the plurality, wherein the second material is one of an electrical conductor and an electrical resistor.

Example 13 includes the subject matter of any of the preceding Examples, further comprising: an adhesive layer on a side of the message film opposite the plurality of carbon nanofiber structures; and a release liner on the adhesive layer.

Example 14 is an apparatus comprising a backing film comprising a substrate; a plurality of carbon nanofiber structures on the backing film; and a thermochromic layer comprising a thermochromic material on the plurality of carbon nanofiber structures.

Example 15 includes the subject matter of Example 14, wherein the thermochromic layer comprises liquid crystal polymer.

Example 16 includes the subject matter of Example 14, wherein the thermochromic layer comprises a leuco dye.

Example 17 includes the subject matter of any of Examples 14-16, wherein the plurality of carbon nanofiber structures comprises an array of linearly arranged carbon nanofibers.

Example 18 includes the subject matter of Example 17, further comprising at least one carbon nanofiber yarn in electrical contact with each linearly arranged carbon nanofiber of the array.

Example 19 includes the subject matter of any of Examples 14-18, wherein the plurality of carbon nanofiber structures comprises a grid of transversely arranged carbon nanofiber yarns.

Example 20 includes the subject matter of any of Examples 17-19, wherein a pitch between adjacent carbon nanofiber yarns is from 100 µm to 1 mm.

Example 21 includes the subject matter of any of Examples 14-20, wherein the carbon nanofiber structures of the plurality are single ply carbon nanofiber yarns.

Example 22 includes the subject matter of any of Examples 14-20, wherein the carbon nanofiber structures of the plurality are multi-ply carbon nanofiber yarns.

Example 23 includes the subject matter of any of Examples 14-22, further comprising an electrode in contact with at least one carbon nanofiber structures of the plurality.

Example 24 includes the subject matter of any of Examples 14-23, wherein a thermal conductivity of the plurality of carbon nanofiber structures transports heat from a heat source to the thermochromic layer in less than 100 milliseconds.

Example 25 includes the subject matter of any of Examples 14-24, further comprising a second material disposed within the carbon nanofiber structures of the plurality, wherein the second material is one of an electrical conductor and an electrical resistor.

Example 26 includes the subject matter of any of Examples 14-25, further comprising: an adhesive layer on a side of the backing film opposite the plurality of carbon nanofiber structures; and a release liner on the adhesive layer.

Example 22 includes the subject matter of any of the preceding examples, wherein the plurality of carbon nanofiber structures is transparent to visible light.

BRIEF DESCRIPTION OF THE DRAWINGS

FIG. 7A' is the cross-sectional view of the thermochromic display in the first configuration illustrating a second location of optional electrodes, in an example of the present disclosure.

Figure 1:
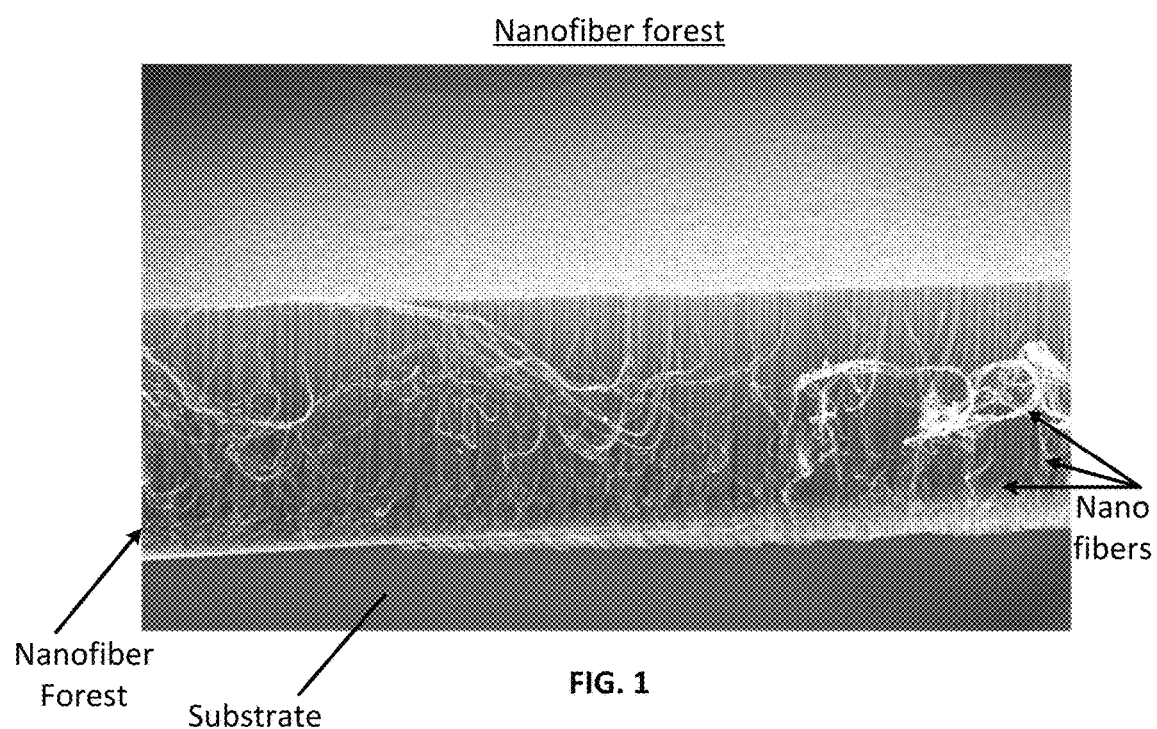
FIG. 1 illustrates an example forest of nanofibers on a substrate, in an example of the present disclosure.

The figures depict various embodiments of the present disclosure for purposes of illustration only. Numerous variations, configurations, and other embodiments will be apparent from the following detailed discussion. Furthermore, as will be appreciated, the figures are not necessarily drawn to scale or intended to limit the described embodiments to the specific configurations shown. For instance, while some figures generally indicate straight lines, right angles, and smooth surfaces, an actual implementation of the disclosed techniques may have less than perfect straight lines and right angles, and some features may have surface topography or otherwise be non-smooth, given real-world limitations of fabrication processes. In short, the figures are provided merely to show example structures.

DETAILED DESCRIPTION

Overview

As indicated above, temperature sensitive labels or indicators can change color and/or opacity (alternatively, transparency) upon a change in temperature. For example, some leuco dyes can turn blue upon arriving at a temperature of less than approximately 5° C. (+/−10° C.). In another example, a layer that includes suitably composed liquid crystals can transition from black to transparent as the temperature increases to an upper threshold (e.g., above 40° C., above 60° C., or above 100° C.). As the liquid crystal layer increases to a temperature above the transition threshold, an underlying message, previously hidden by the thermochromic layer of liquid crystals at the lower temperatures (black in color and/or more generally opaque), becomes visible. As used herein, a material is transparent if it exhibits greater than 75% transmission of light in the range of 400 to 700 nm. A material is opaque if it transmits less than 25% of light in the range of 400 to 700 nm.

However, the response time of thermochromic layers can be slow. For example, in some cases, the thermochromic material (whether leuco dye, liquid crystal polymer, or other thermochromic material) can be placed on a polymer substrate or disposed within a polymer matrix. The thermal conductivity of most polymers is low. This low thermal conductivity of the polymer substrate/matrix slows the transport of heat from a heat source to the thermochromic material. A slow rate of heat transport from the heat source to the thermochromic layer can decrease the time between application of a temperature change and a corresponding thermochromic transition of the thermochromic material to a range of seconds to tens of seconds. With this delay, the use of a thermochromic layers is less appealing because the time delay can cause the displayed indication of a high or low temperature to be inaccurate.

Thus, in accordance with some embodiments of the present disclosure, techniques are described for the fabrication of thermochromic displays with a response time (i.e., a time between application of a temperature change and a thermochromic transition from opaque to transparent, from a first color to transparent, and/or from a first color to a second color) that is less than 100 milliseconds (ms). In some examples, a thermochromic transition occurs upon a thermochromic layer equilibrating to a transition temperature. In some examples, the transition temperature can be a high temperature (e.g., greater than 40° C.) or in other examples, a low temperature (e.g., less than 5° C.).

To accomplish the rapid response time of less than 100 ms, embodiments of the present disclosure include conductive structure that are in direct contact with and/or proximate to a thermochromic layer. In some examples, the conductive structures can include strands of thermally and/or electrically conductive materials such as metal (e.g., aluminum, copper, iron, alloys thereof), and carbon nanofiber structures. Carbon nanofiber structures can include strands and/or bundles of (untwisted) carbon nanofibers (whether single walled or multi-walled), twisted carbon nanofiber yarns (whether single ply or multi-ply), graphene, among others. For convenience of description, many of the embodiments described herein are presented as including carbon nanofiber yarns, but it will be appreciated that any of the preceding conductive structures can be used in thermochromic displays as described below.

As described below, conductive structures are disposed between the thermochromic layer and a film that carries the message to be displayed. Because of the high thermal conductivity of conductive structures (e.g., metal strands, untwisted carbon nanofiber strands/bundles, nanofiber yarns), heat can be conducted to and/or conducted away from the thermochromic layer much more rapidly than in the absence of a conductive structure. For example, conventionally configured thermochromic displays often have one or more polymer layers (such as carrier films) and/or one or more adhesive layers that will ultimately be disposed between a thermochromic layer and a heat source. These layers of conventionally configured thermochromic displays are generally good thermal insulators, which slows the transition of the thermochromic layer between colors or from opaque to transparent. The presence of a conductive structure that is a good thermal conductor, can improve the response time by delivering heat directly to a thermochromic layer. In examples in which the conductive structure is a carbon nanofiber strand, bundles, and/or yarn, the small diameter of the carbon nanofiber structure (in some cases less than 0.5 μm), enables many carbon nanofiber structures can be disposed between the message and the thermochromic layer without degrading the visual quality of the message that is ultimately displayed.

Prior to describing thermochromic displays of the present disclosure, the fabrication and configuration of nanofiber forests, nanofiber sheets, and nanofiber yarns is described.

Nanofiber Forests

As used herein, the term "nanofiber" means a fiber having a diameter less than 1 μm. While the embodiments herein are primarily described as fabricated from carbon nanotubes, it will be appreciated that other carbon allotropes, whether graphene, micron or nano-scale graphite fibers and/or plates, and even other compositions of nano-scale fibers such as boron nitride may be densified using the techniques described below. As used herein, the terms "nanofiber" and "carbon nanotube" encompass both single walled carbon nanotubes and/or multi-walled carbon nanotubes in which carbon atoms are linked together to form a cylindrical structure. In some embodiments, carbon nanotubes as referenced herein have between 4 and 10 walls. As used herein, a "nanofiber sheet" or simply "sheet" refers to a sheet of nanofibers aligned via a drawing process (as described in PCT Publication No. WO 2007/015710, and incorporated by reference herein in its entirety) so that a longitudinal axis of a nanofiber of the sheet is parallel to a major surface of the sheet, rather than perpendicular to the major surface of the sheet (i.e., in the as-deposited form of the sheet, often referred to as a "forest"). This is illustrated and shown in FIGS. 3 and 4, respectively.

The dimensions of carbon nanotubes can vary greatly depending on production methods used. For example, the diameter of a carbon nanotube may be from 0.4 nm to 100 nm and its length may range from 10 μm to greater than 55.5 cm. Carbon nanotubes are also capable of having very high aspect ratios (ratio of length to diameter) with some as high as 132,000,000:1 or more. Given the wide range of dimensional possibilities, the properties of carbon nanotubes are highly adjustable, or "tunable." While many intriguing properties of carbon nanotubes have been identified, harnessing the properties of carbon nanotubes in practical applications requires scalable and controllable production methods that allow the features of the carbon nanotubes to be maintained or enhanced.

Due to their unique structure, carbon nanotubes possess particular mechanical, electrical, chemical, thermal and optical properties that make them well-suited for certain applications. In particular, carbon nanotubes exhibit superior electrical conductivity, high mechanical strength, good thermal stability and are also hydrophobic. In addition to these properties, carbon nanotubes may also exhibit useful optical properties. For example, carbon nanotubes may be used in light-emitting diodes (LEDs) and photo-detectors to emit or detect light at narrowly selected wavelengths. Carbon nanotubes may also prove useful for photon transport and/or phonon transport.

In accordance with various embodiments of the subject disclosure, nanofibers (including but not limited to carbon nanotubes) can be arranged in various configurations, including in a configuration referred to herein as a "forest." As used herein, a "forest" of nanofibers or carbon nanotubes refers to an array of nanofibers having approximately equivalent dimensions that are arranged substantially parallel to one another on a substrate. FIG. 1 shows an example forest of nanofibers on a substrate. The substrate may be any shape but in some embodiments the substrate has a planar surface on which the forest is assembled. As can be seen in FIG. 1, the nanofibers in the forest may be approximately equal in height and/or diameter.

Nanofiber forests as disclosed herein may be relatively dense. Specifically, the disclosed nanofiber forests may have a density of at least 1 billion nanofibers/cm2. In some specific embodiments, a nanofiber forest as described herein may have a density of between 10 billion/cm2 and 30 billion/cm2. In other examples, the nanofiber forest as described herein may have a density in the range of 90 billion nanofibers/cm2. The forest may include areas of high density or low density and specific areas may be void of nanofibers. The nanofibers within a forest may also exhibit inter-fiber connectivity. For example, neighboring nanofibers within a nanofiber forest may be attracted to one another by van der Waals forces. Regardless, a density of nanofibers within a forest can be increased by applying techniques described herein.

Methods of fabricating a nanofiber forest are described in, for example, PCT No. WO2007/015710, which is incorporated herein by reference in its entirety.

Figure 2:
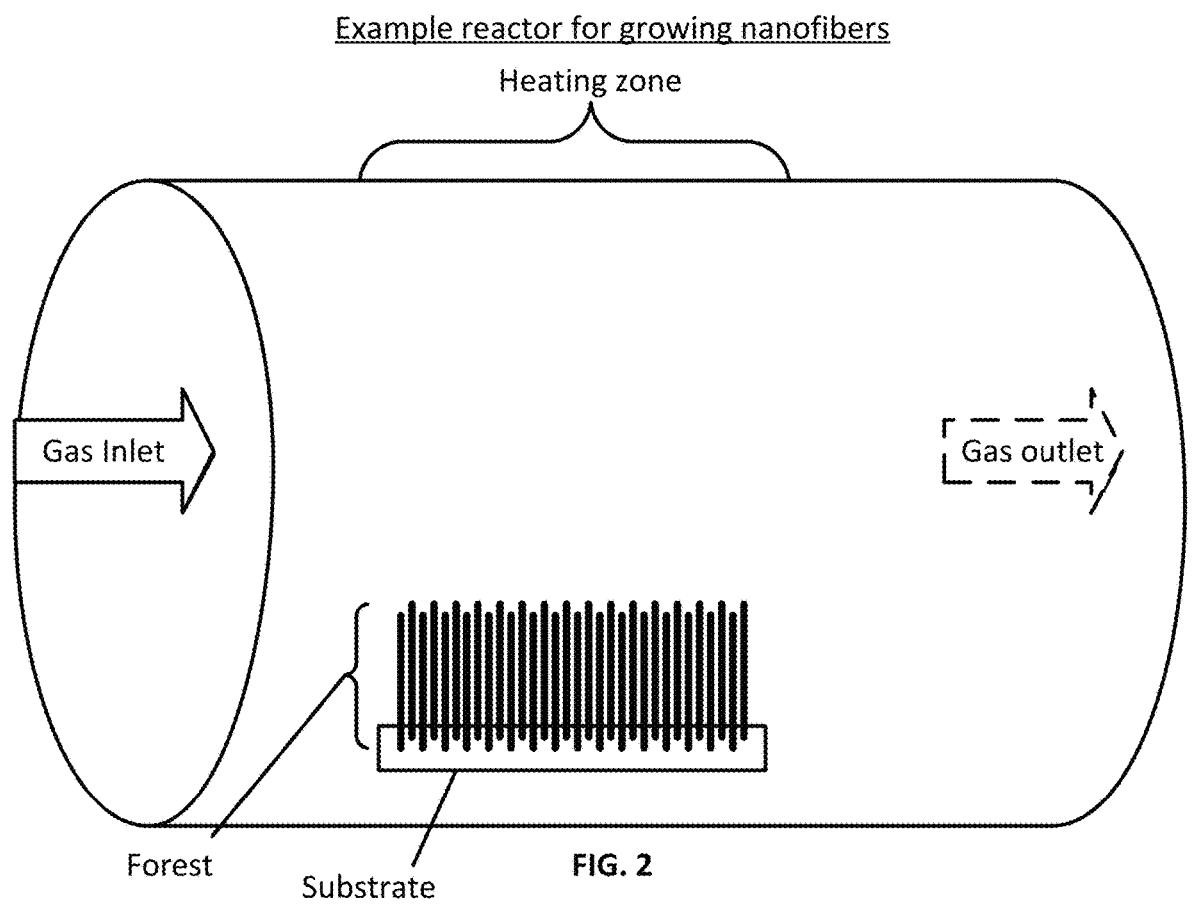
FIG. 2 is a schematic view of a furnace for the growth and synthesis of a nanofiber forest, in an example of the present disclosure.

Various methods can be used to produce nanofiber precursor forests. For example, in some embodiments nanofibers may be grown in a high-temperature furnace, schematically illustrated in FIG. 2. In some embodiments, catalyst may be deposited on a substrate, placed in a reactor and then may be exposed to a fuel compound that is supplied to the reactor. Substrates can withstand temperatures of greater than 800° C. or even 1000° C. and may be inert materials. The substrate may comprise stainless steel or aluminum disposed on an underlying silicon (Si) wafer, although other ceramic substrates may be used in place of the Si wafer (e.g., alumina, zirconia, SiO2, glass ceramics). In examples where the nanofibers of the precursor forest are carbon nanotubes, carbon-based compounds, such as acetylene may be used as fuel compounds. After being introduced to the reactor, the fuel compound(s) may then begin to accumulate on the catalyst and may assemble by growing upward from the substrate to form a forest of nanofibers. The reactor also may include a gas inlet where fuel compound(s) and carrier gasses may be supplied to the reactor and a gas outlet where expended fuel compounds and carrier gases may be released from the reactor. Examples of carrier gases include hydrogen, argon, and helium. These gases, in particular hydrogen, may also be introduced to the reactor to facilitate growth of the nanofiber forest. Additionally, dopants to be incorporated in the nanofibers may be added to the gas stream.

In a process used to fabricate a multilayered nanofiber forest, one nanofiber forest is formed on a substrate followed by the growth of a second nanofiber forest in contact with the first nanofiber forest. Multi-layered nanofiber forests can be formed by numerous suitable methods, such as by forming a first nanofiber forest on the substrate, depositing catalyst on the first nanofiber forest and then introducing additional fuel compound to the reactor to encourage growth of a second nanofiber forest from the catalyst positioned on the first nanofiber forest. Depending on the growth methodology applied, the type of catalyst, and the location of the catalyst, the second nanofiber layer may either grow on top of the first nanofiber layer or, after refreshing the catalyst, for example with hydrogen gas, grow directly on the substrate thus growing under the first nanofiber layer. Regardless, the second nanofiber forest can be aligned approximately end-to-end with the nanofibers of the first nanofiber forest although there is a readily detectable interface between the first and second forest. Multi-layered nanofiber forests may include any number of forests. For example, a multi-layered precursor forest may include two, three, four, five or more forests.

Nanofiber Sheets

Figure 3:
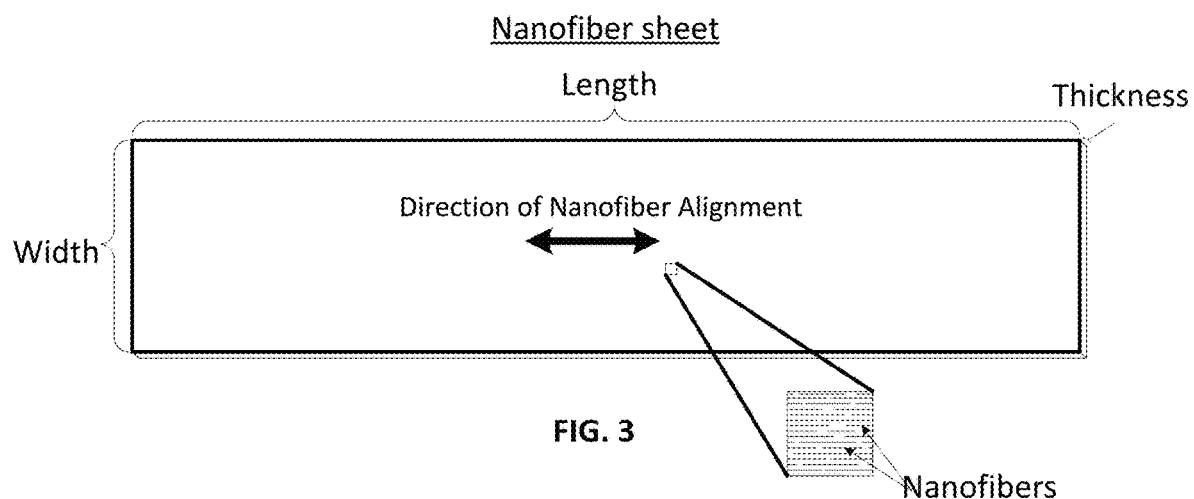
FIG. 3 is an illustration of a nanofiber sheet that identifies relative dimensions of the sheet and schematically illustrates nanofibers within the sheet aligned end-to-end in a plane parallel to a surface of the sheet, in an example of the present disclosure.

In addition to arrangement in a forest configuration, the nanofibers of the subject application may also be arranged in a sheet configuration. As used herein, the term "nanofiber sheet," "nanotube sheet," or simply "sheet" refers to an arrangement of nanofibers where the nanofibers are aligned end to end in a plane. An illustration of an example nanofiber sheet is shown in FIG. 3 with labels of the dimensions. In some embodiments, the sheet has a length and/or width that is more than 100 times greater than the thickness of the sheet. In some embodiments, the length, width or both, are more than $10^3$, $10^6$ or $10^9$ times greater than the average thickness of the sheet. A nanofiber sheet can have a thickness of, for example, between approximately 5 nm and 30 μm and any length and width that are suitable for the intended application. In some embodiments, a nanofiber sheet may have a length of between 1 cm and 10 meters and a width between 1 cm and 1 meter. These lengths are provided merely for illustration. The length and width of a nanofiber sheet are constrained by the configuration of the manufacturing equipment and not by the physical or chemical properties of any of the nanotubes, forest, or nanofiber sheet. For example, continuous processes can produce sheets of any length. These sheets can be wound onto a roll as they are produced.

As can be seen in FIG. 3, the axis in which the nanofibers are aligned end-to end is referred to as the direction of nanofiber alignment. In some embodiments, the direction of nanofiber alignment may be continuous throughout an entire nanofiber sheet. Nanofibers are not necessarily perfectly parallel to each other and it is understood that the direction of nanofiber alignment is an average or general measure of the direction of alignment of the nanofibers.

Nanofiber sheets may be assembled using any type of suitable process capable of producing the sheet. In some example embodiments, nanofiber sheets may be drawn from a nanofiber forest. An example of a nanofiber sheet being drawn from a nanofiber forest is shown in FIG. 4

Figure 4:
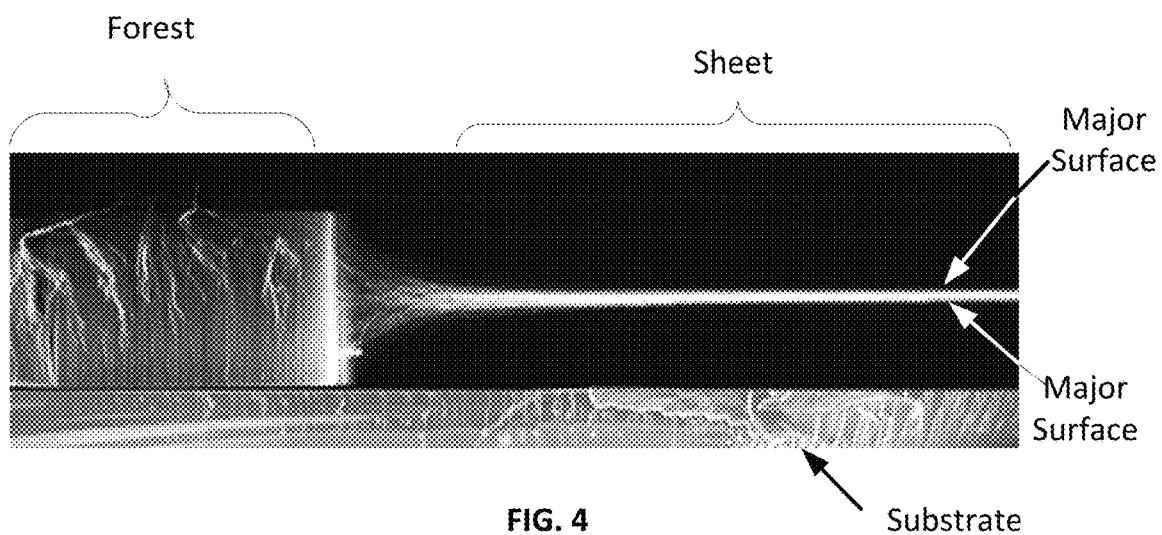
FIG. 4 is an image of a nanofiber sheet being laterally drawn from a nanofiber forest, the nanofibers aligning from end-to-end as schematically shown in FIG. 2.

As can be seen in FIG. 4, the nanofibers may be drawn laterally from the forest and then align end-to-end to form a nanofiber sheet. In embodiments where a nanofiber sheet is drawn from a nanofiber forest, the dimensions of the forest may be controlled to form a nanofiber sheet having particular dimensions. For example, the width of the nanofiber sheet may be approximately equal to the width of the nanofiber forest from which the sheet was drawn. Additionally, the length of the sheet can be controlled, for example, by concluding the draw process when the desired sheet length has been achieved.

Nanofiber sheets have many properties that can be exploited for various applications. For example, nanofiber sheets may have tunable opacity, high mechanical strength and flexibility, thermal and electrical conductivity, and may also exhibit hydrophobicity. Given the high degree of alignment of the nanofibers within a sheet, a nanofiber sheet may be extremely thin. In some examples, a nanofiber sheet is on the order of approximately 10 nm thick (as measured within normal measurement tolerances), rendering it nearly two-dimensional. In other examples, the thickness of a nanofiber sheet can be as high as 200 nm or 300 nm. As such, nanofiber sheets may add minimal additional thickness to a component.

As with nanofiber forests, the nanofibers in a nanofibers sheet may be functionalized by a treatment agent by adding chemical groups or elements to a surface of the nanofibers of the sheet and that provide a different chemical activity than the nanofibers alone. Functionalization of a nanofiber sheet can be performed on previously functionalized nanofibers or can be performed on previously unfunctionalized nanofibers. Functionalization can be performed using any of the techniques described herein including, but not limited to CVD, and various doping techniques.

Nanofiber sheets, as drawn from a nanofiber forest, may also have high purity, wherein more than 90%, more than 95% or more than 99% of the weight percent of the nanofiber sheet is attributable to nanofibers, in some instances. Similarly, the nanofiber sheet may comprise more than 90%, more than 95%, more than 99% or more than 99.9% by weight of carbon.

Nanofiber Yarns

Figure 5A:
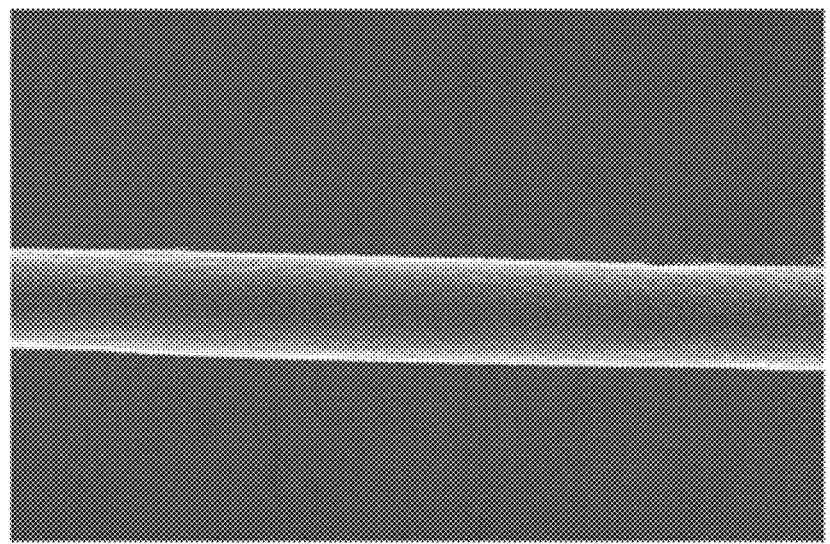
FIG. 5A is an image of a single ply, false twisted nanofiber yarn, in an example of the present disclosure.

Nanofiber sheets drawn from a nanofiber forest can be spun into nanofiber yarns. Nanofiber yarns can be single ply nanofiber yarns that are formed from the true-twisting or false-twisting of a single nanofiber sheet into a single strand of nanofiber yarn. An example of this is shown in FIG. 5A and described below in more detail. Multiple single ply nanofiber yarns can be plied together to form a multi-ply yarn. An example of this is shown in FIG. 5B and described below in more detail.

FIG. 5A illustrates the scanning electron microscope (SEM) image of a single ply, false twisted nanofiber yarn of the present disclosure. As indicated above, false twisting techniques are described in U.S. patent application Ser. No. 15/844,756, which is incorporated by reference herein in its entirety. In some examples, a single ply, false twisted nanofiber yarn such as the one illustrated in FIG. 5A, can have a cross-sectional diameter (taken perpendicular to a longitudinal axis of the yarn) within any of the following ranges: from 5 μm to 40 μm; from 5 μm to 30 μm; from 5 μm to 20 μm; from 10 μm to 30 μm; from 50 μm to 40 μm; from 25 μm to 35 μm, less than 40 μm, less than 30 μm, less than 20 μm, greater than 5 μm, greater than 10 μm or greater than 20 μm. In the specific example of the nanofiber yarn shown in FIG. 5A, the cross-sectional diameter is approximately 15 μm. The nanofiber yarn depicted in FIG. 5A has surface topography features that are less than 1 μm (and in some examples less than 0.1 μm) above or below an average location of the surface crossed a length and surface of the yarn.

Figure 5B:
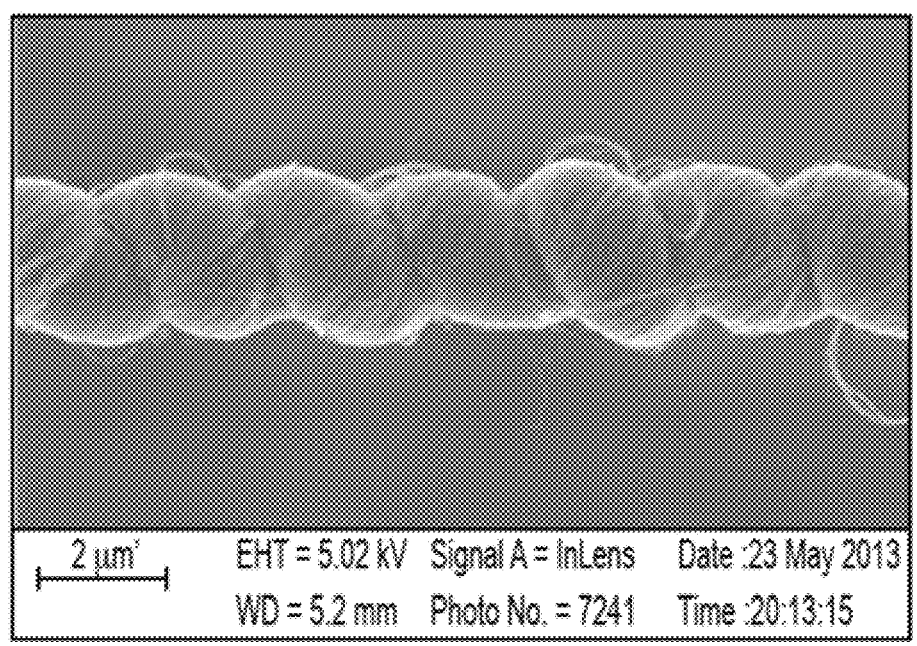
FIG. 5B is an image of a multi ply, false twisted nanofiber yarn, in an example of the present disclosure.

FIG. 5B is an SEM micrograph of a multi-ply nanofiber yarn, in an example of the present disclosure. As indicated above, a multi-ply nanofiber yarn can be fabricated by plying together two or more single ply nanofiber yarns. These multi-ply yarns can have increased thermal, electrical, and mechanical properties in proportion to the increased number of fibers to transport heat and/or electricity, or bear a stress.

In some examples, nanofiber yarns (and nanofiber sheets before being spun into a nanofiber yarn) can be optionally "densified" using a solvent. During densification, a solvent is applied to the nanofiber yarn (or nanofiber sheet). The solvent causes the individual nanofibers of the yarn (or nanofiber sheet) to draw closer to one another either upon application, upon removal of the solvent, or both, thus increasing the number of nanofibers per unit volume (i.e., density). This increase in density of the nanofiber yarn (or nanofiber sheet) can, for example, increase electrical conductivity, thermal conductivity, ultimate tensile strength, among other properties.

This process of applying, and subsequently removing, a solvent can also be used to coat at least one additional material onto surfaces of nanofibers within a nanofiber yarn (or sheet) and/or place the at least one additional material within the gaps between nanofibers. For example, nanoparticles or microparticles can be suspended in a solvent and carried into the gaps within a nanofiber yarn (or sheet) that are defined by the nanofibers of the yarn. The solvent can be removed, leaving the particles within the gaps formed by the nanofibers that form the nanofiber yarn and/or nanofiber sheet. Analogously, a polymer (or polymers, or a polymer mixed with nano or micro particles) can be infiltrated within the nanofiber yarn (or sheet). Upon removal of the solvent, the polymer (and any third material, such as nanoparticles) will remain within the nanofiber yarn (or sheet), and alter the properties accordingly. For example, adding conductive particles can increase the electrical and/or thermal conductivity of the nanofiber yarn.

Method of Fabrication

Figure 6:
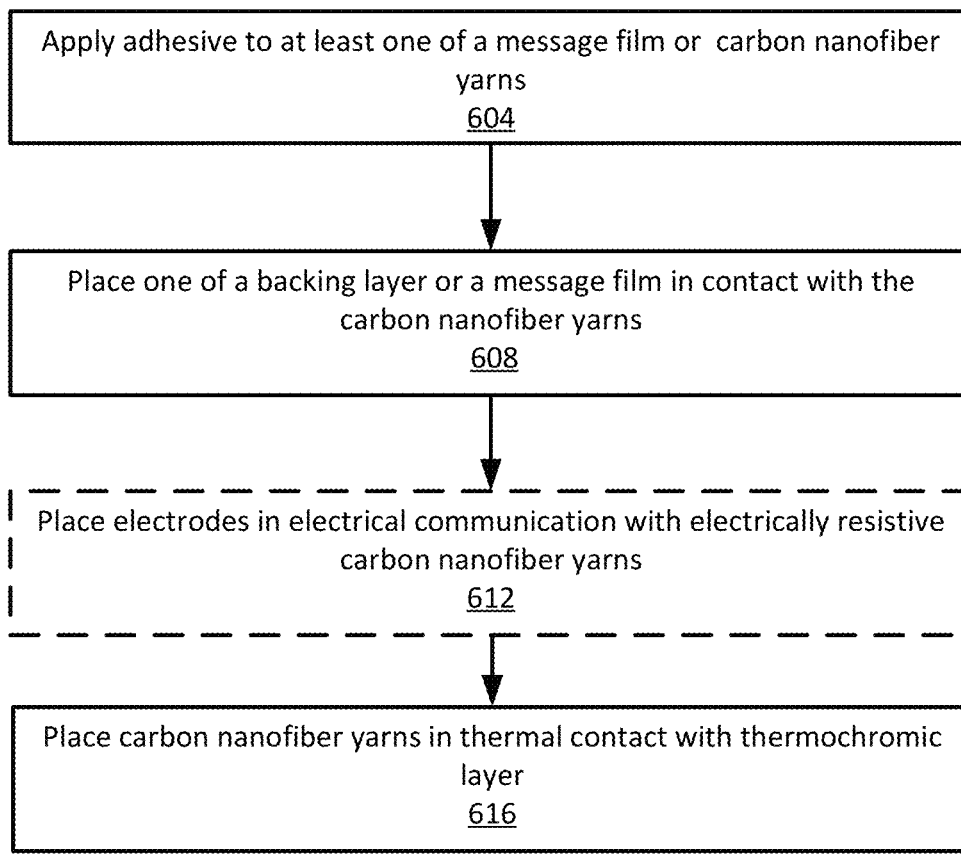
FIG. 6 is method flow diagram illustrating an example method for fabricating a thermochromic display, in an example of the present disclosure.

FIG. 6 illustrates an example method 600 for fabricating a thermochromic display, in an example of the present disclosure. The individual structural components of the thermochromic display being fabricated in the method 600 are explained below in more detail in the context of FIGS. 7A, 7A', 7B, 8A, and 8B.

The method 600 includes applying 604 an adhesive (e.g., an acrylic adhesive or pressure sensitive adhesive) to at least one of a message film (or backing layer) or carbon nanofiber structures. In some examples, an adhesive is infiltrated into the carbon nanofiber structures (e.g., nanofibers, nanofiber bundles or strands, nanofiber yarns), as described above. In some examples, adhesive is applied 604 to the message film in a continuous layer or in separate discrete locations (such as stripes or dots of adhesive that are physically separated from one another). In still another example, complementary components of an adhesive system (e.g., a two component epoxy) can be separately applied to the message film and the carbon nanofiber structures so that physical contact between the treated message film and carbon nanofiber structures completes the adhesive system, thus causing them to react and adhere. Regardless of the adhesive system used, the message film (or backing layer) and the carbon nanofiber structures are placed 608 into contact with one another.

In some examples, electrodes can optionally be placed 612 in communication with the carbon nanofiber structures. Electrical current can then be applied to the carbon nanofiber structures, causing the carbon nanofiber structures to resistively heat, which in turn causes a change in temperature of the thermochromic layer and a corresponding change in color and/or transparency. The electrodes can be placed in electrical communication with some or all of the nanofiber structures. In some examples, the optional electrodes are placed in direct or indirect contact with a longitudinal surface of the some of the carbon nanofiber structures. In some examples, the optional electrodes are placed in direct or indirect contact with a cross-sectional surface of the some or all of the carbon nanofiber structures.

The carbon nanofiber structures are placed 616 in thermal contact with a thermochromic layer. In this case, the phrase thermal contact refers to direct or indirect physical contact.

In some examples, an additional adhesive layer and a release liner can be attached to a side of the message layer or backing layer opposite the side applied to the carbon nanofiber yarns. The release liner can be removed, exposing a side of the additional adhesive layer. This additional adhesive layer side, once exposed, can then be used to adhere the thermochromic display to an underlying substrate. In some cases, the underlying substrate is also a heat source that causes the thermochromic effect to take place. In some cases, a layer comprising carbon nanofiber structures can exhibit thermal conductivity of greater than 1.0, greater than 2.0 or greater than 3.0 W/(m·K). Similarly, carbon nanofiber structures in an adhesive layer can improve the thermal conductivity of the adhesive layer by greater than 0.1, greater than 0.5, greater than 1.0, greater than 1.5 or greater than 2.0 W/(m·K).

Thermochromic Displays

As indicated above, thermochromic displays include conductive structures that are able to respond to changes in temperature on time scales that are orders of magnitude faster than traditional thermochromic displays. As indicated above, the examples below are described as including carbon nanofiber yarns for convenience. In some examples, the high thermal conductivity of carbon nanofiber yarns (or alternatively, carbon nanofiber bundles, strands, graphene, or other conductive composition) helps transport and distribute heat from a heat source to the thermochromic layer or conduct heat away from the thermochromic layer to a low temperature (cold) source. In some cases, carbon nanofiber yarns efficiently absorb and radiate infra-red radiation (i.e., more than 85% of incoming IR radiation is radiated out as heat). In light of these properties, the presence of carbon nanofiber yarns can decrease the response time of a thermochromic display to a temperature change of as little as 10° C. In some examples the response time decreases from tens of seconds in conventional embodiments to a few milliseconds in examples of the present disclosure. Conventionally configured thermochromic displays and/or labels generally have at least one polymer carrier film and at least two adhesive layers between a heat source and a thermochromic layer, all of which are poor thermal conductors. The presence of carbon nanofiber yarns, as described herein, can help overcome the poor thermal conductivity that slows the thermochromic transition in traditional thermochromic displays.

Figure 7A:
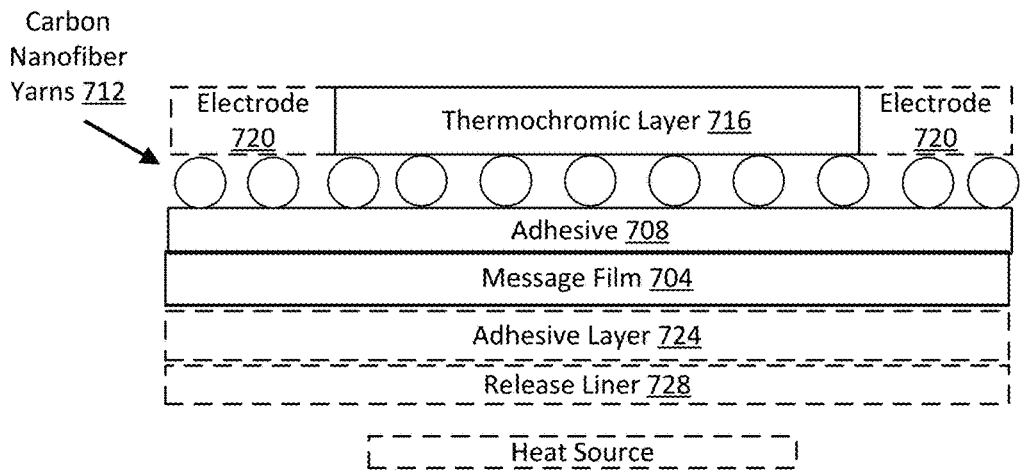
FIG. 7A is a cross-sectional view of a thermochromic display in a first configuration, in an example of the present disclosure.
Figure 7A:
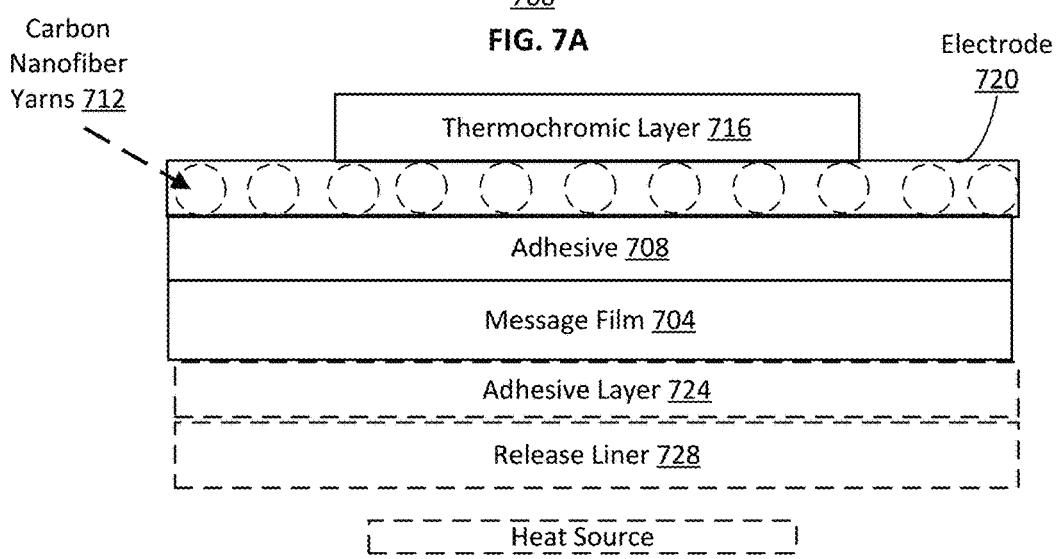

Turning now to FIG. 7A, an example thermochromic display 700 of the present disclosure is shown in cross-section, in an example. The example thermochromic display 700 includes a message film 704, an adhesive 708, a layer of carbon nanofiber yarns 712, and a thermochromic layer 716. Optional elements are shown in dashed lines and include electrodes 720, a second adhesive layer 724, and a release liner 728.

The message film 704 can include any surface on which information can be printed, written, shown, or depicted. In some examples, the message film 704 is a polymer film on which text, a color, or an image that is indicative of or related to a change in temperature for a proximate surface is printed. In other examples, the message film 704 can be a fabric, paper, or even in some cases a metallic film or plate. In some examples, the message is printed or otherwise placed on the same side of the message film that the carbon nanofiber yarns 712 and thermochromic layer 716 will ultimately be disposed. In one example, as will be explained below in more detail, the thermochromic layer 716 can obscure the message until the threshold temperature that causes the thermochromic layer 716 to change from opaque (or from a first color) to transparent is achieved.

In the example 700 shown in FIG. 7A, an adhesive 708 is disposed between the message film 704 and the carbon nanofiber yarns 712. The function of this adhesive 708 is to connect the message film to the other elements of the display 700 that are not otherwise adhesive. In some examples, however, this adhesive layer 708 can be omitted if the carbon nanofiber yarns 712 have been infiltrated with or coating with an adhesive (e.g., a pressure sensitive adhesive). Examples of the adhesive 708 can include acrylic adhesives, pressure sensitive adhesives, epoxies, thermally sensitive adhesives, among others.

Generally, the carbon nanofiber yarns 712 are disposed between the message film 704 and the thermochromic layer 716. In the example display 700, the carbon nanofiber yarns 712 are disposed between the adhesive 708 (attached to a display side of the message film 704) and the thermochromic layer 716. The carbon nanofiber yarns 712 can, in various examples, be multi-ply nanofiber yarns or single ply nanofiber yarns. Furthermore, the carbon nanofiber yarns 712 B true twist yarns or false twist yarns. False twist yarns are described in U.S. patent application Ser. No. 15/844,756 which is incorporated herein in its entirety. It will be appreciated that in some embodiments of the example display 700, both types of single ply and multi-ply nanofiber yarns can be used. The yarns may comprise single walled or multi-walled carbon nanotubes.

Furthermore as described above, the carbon nanofiber yarns 712 can be infiltrated with any of a number of materials. For example, conductive microparticles or nanoparticles that increase the thermal conductivity of the carbon nanofiber yarns 712 can be infiltrated into the carbon nanofiber yarns 712 prior to installation within the example display 700. In one example, silver nanoparticles approximately 200 nm in length can be infiltrated in with a solvent, such as toluene or isopropyl alcohol. The presence of these nanoparticles (or some other metallic or conductive nanoparticle) can facilitate transmission of thermal energy from a heat source to the thermochromic layer 716. In an alternative embodiment, nanoparticles or microparticles that have a high electrical resistivity and thus generate heat upon application of electricity can be infiltrated into the nanofiber yarns 712. For example, tungsten nanoparticles from 100 nm to 500 nm in diameter can be infiltrated into the carbon nanofiber yarns using a solvent (such as toluene or isopropyl alcohol). After removal of the solvent, the text and nanoparticles remain within the structure of the carbon nanofiber yarns 712. Upon application of an electrical current to the carbon nanofibers, which are good electrical conductors, the tungsten particles, which are electrical resistors, will generate heat. Such an embodiment can then be used in an application in which an external heat source is either not present or insufficient for the application.

The carbon nanofiber yarns 712 can be in any number of configurations that facilitate efficient and rapid heat transmission to and from the thermochromic layer 716. For example, in some embodiments the carbon nanofiber yarns of the plurality 712 are each linearly arranged from one side of the example display 700 and to another. It will be appreciated that in some examples of the linear array, the carbon nanofiber yarns 712 are substantially parallel (within +/−30° of one another). While they may be arranged so as to not contact one another, this need not be the case. In other examples, the carbon nanofiber yarns 712 can be arranged in spirals, nested spirals, or in a grid in which a first set of substantially parallel nanofiber yarns are connected to (or in direct or indirect contact with) a crosswise or transversely arranged second set of substantially parallel nanofiber yarns. In certain embodiments, a pitch (e.g., the center to center distance between adjacent nanofiber yarns) in any of the arrays, grids, or arrangements can be within any of the following ranges: from 100 μm to 1 mm; from 100 μm to 500 μm; from 500 μm to 750 μm; from 750 μm to 1 mm; from 1 mm to 5 mm; from 100 μm to 1 mm; from 250 μm to 750 μm.

The thermochromic layer 716 is in contact, either directly or indirectly with the carbon nanofiber yarns 712. As explained above, heat from a heat source can be transported by the carbon nanofiber yarns 712 to the thermochromic layer 716 in a matter of milliseconds (ms), thus decreasing the response time between generation of heat at the heat source and the change in color and/or transparency at the thermochromic layer 716.

Optionally, the thermochromic display 700 can include electrodes 720 instead of, or in addition to, the heat or cooling source. The electrodes 720 can apply an electrical current to the carbon nanofiber yarns 712. In the example depicted, it will be appreciated that the electrodes 720 are in electrical contact with all of the carbon nanofiber yarns 712 even though the illustration shows the electrodes 720 in contact with the longitudinal surfaces of only two of the nanofiber yarns 712 at each side of the display 700. This electrical contact between the electrodes 720 and all of the nanofiber yarns 712 can be accomplished by, for example, one or more carbon nanofiber yarns connected to the electrodes that are transverse to the carbon nanofiber yarns 712 depicted in FIG. 7A. In another example illustrated in FIG. 7A', the electrodes 720 are in electrical contact with all of the nanofiber yarns 712 at exposed cross-sectional surfaces of the nanofiber yarns 712. As described above, for this embodiment the carbon nanofiber yarns 712 can be treated (e.g. infiltrated with material that is an electrical resistor) so that an electrical current produces heat within the carbon nanofiber yarns 712. In this way, heat can cause a transition within thermochromic layer 716 even for cases in which the thermochromic display 700 is not connected to a heat source.

As explained above, in one example the thermochromic layer 716 can either obscure an image or text on the message film 704. The configuration corresponding to this example is depicted in FIG. 7A. As explained above, the thermochromic layer 716 in this example obscures the message printed on the message film 704. Heat transported to the thermochromic layer 716 by the carbon nanofiber yarns 712 (or generated within the carbon nanofiber yarns) causes the thermochromic layer 716 to transition from an opaque state (or a first colored state) to a transparent state. It is this transition that reveals the message on the message film 704.

Figure 7B:
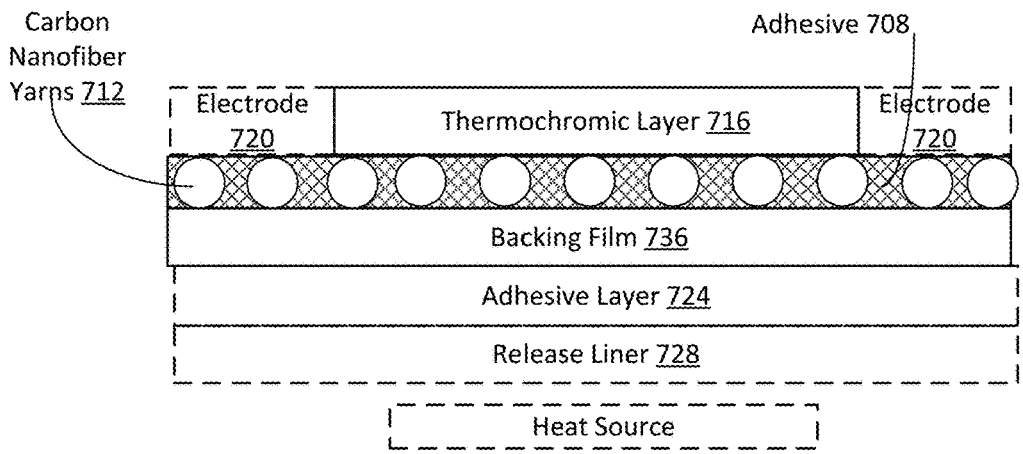
FIG. 7B is a cross-sectional view of a thermochromic display in a second configuration, in an example of the present disclosure.

In another example, it is the thermochromic layer 716 itself that conveys information to a viewer. An illustration of the configuration of the display that can do this appears in FIG. 7B. In this example configuration of a thermochromic display 732, the message film is unnecessary. Rather, a backing film 736 provides a substrate onto which the adhesive layer 708 is applied. Furthermore, the backing film 736 provides a substrate onto which adhesive layer 724 and release liner 728 can be attached for embodiments in which the thermochromic display 732 is a sticker or otherwise adhered to an underlying surface. Heat is either transported from the heat source to the carbon nanofiber yarns 712 and then onto the thermochromic layer 716, which then changes color and/or transparency. Alternatively, as described above, the electrodes 720 can apply heat and or current to the carbon nanofiber yarns 712, thus initiating the transition in the thermochromic layer 716 whether it is a color transition or and transparency transition.

In some examples, the thermochromic layer 716 can be a polymer film that is coated with, or filled with, thermochromic materials. These materials can include, but are not limited to, liquid crystal polymer molecules, organic and inorganic pigments, and leuco dyes. In other examples, thermochromic layer 716 is a paint, film, coating, or layer of one or more of a binder and a thermochromic material. The binders and/or films that can include a thermochromic material include, but are not limited to, polymer films (whether thermoplastic, thermosetting, elastomeric), paints, powders and pigments among others.

The optional electrodes 720, that are in electrical contact with the carbon nanofiber yarns 712, can include conductive elements that are in direct or indirect contact with carbon nanofiber yarns 712. For example a metallic tape, such as copper, nickel/copper alloy, aluminum, aluminum/copper alloy, among others, can be adhered to some of the carbon nanofiber yarns 712. As described above, additional carbon nanofiber yarns not shown in FIGS. 7A, 7B can connect the subset of carbon nanofiber yarns 712 in direct electrical contact with the electrodes 720 with any carbon nanofiber yarns 712 not in direct contact with the electrodes 720.

In another example, the optional electrodes 720 can be solder contacts that connect an electrical conductor (not shown) to the carbon nanofiber yarns 712. While carbon nanofiber yarns 712 may have a low adhesion with materials traditionally used for solders, the carbon nanofiber yarns 712 can be processed to include one or more metal layers, such as a first layer of tungsten that forms a tightly adhering carbide on the nanofiber yarn and a second layer, such as copper, aluminum, gold, on the tungsten carbide layer. These metallized layers (applied by e.g., physical vapor deposition, chemical vapor deposition, sputtering) on the carbon nanofiber yarns 712 can improve the adhesion to a solder material.

Figure 8A:
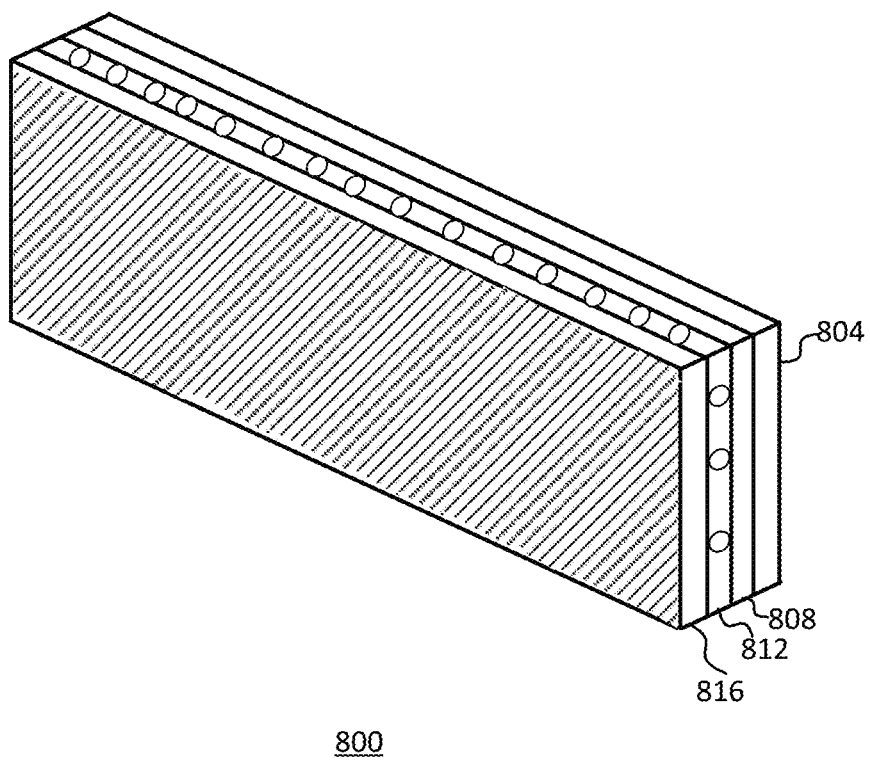
FIGS. 8A and 8B, illustrate a transition of a thermochromic layer of an example thermochromic display from an opaque state to a transparent state, in an example of the present disclosure.
Figure 8B:
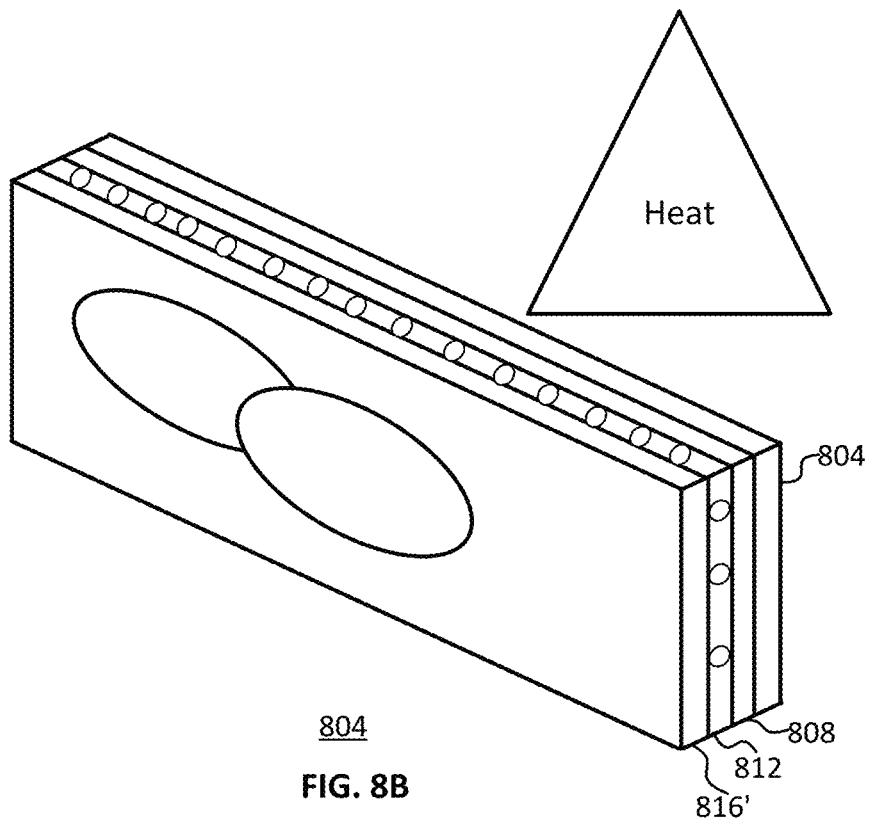

FIGS. 8A and 8B schematically illustrate the thermochromic effect exhibited by some embodiments of the present disclosure. As shown in FIG. 8A, the thermochromic display 800 in an opaque state includes a message layer 804, an adhesive layer 808, carbon nanofiber yarns 812 (in this example, configured in a grid), and an opaque thermochromic layer 816. These layers have been previously described in the context of FIG. 7A and need no further explanation.

FIG. 8B illustrates the transition from an opaque state of the thermochromic layer 816 to a transparent state 816' upon application of heat. As shown, the previously opaque thermochromic layer 816 is now in a transparent state 824, displaying the linked ellipses printed on the message layer 804.

In the preceding examples, carbon nanofiber yarns are oriented so that their longitudinal axes are parallel to (and in contact with) an adjacent surface of the thermochromic layer. In some examples, not shown, carbon nanofiber yarns can be embedded in a matrix and placed on the thermochromic layer so that the longitudinal axes of the yarns are perpendicular to the adjacent surface of the thermochromic layer. For instance, parallel carbon nanofiber yarns can be embedded into a thermoplastic adhesive and then sliced with a microtome to provide cross sections of adhesive/yarn composites. These slices can then be used to join, for example, the message film and the thermochromic layer to provide carbon nanotube yarns that are normal to the thermochromic layer and/or the heat source. This can provide advantageous thermal transfer properties in some circumstances.

EXPERIMENTAL RESULTS

In an experiment, a conventional thermochromic display was placed on an incandescent light bulb that was not turned on. When the light bulb was turned on, the thermochromic display took 13 seconds to change from a first colored state to a transparent state.

A thermochromic display of the present disclosure was prepared to include an array of linearly arranged, substantially parallel carbon nanofiber yarns, as described above in the context of FIG. 7A. This thermochromic display of the present disclosure was placed on the light bulb and the lightbulb was turned on. The thermochromic layer changed from a first colored state to a transparent state in less than 100 milliseconds, which illustrated the beneficial results of embodiments described herein.

Furthermore, upon transitioning back to a first colored state, the conventional display took over three times longer than the display of the present disclosure.

FURTHER CONSIDERATIONS

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. An apparatus, comprising:
    a message film comprising a substrate and at least one of a text or an image on the substrate;
    a thermochromic layer oriented in a plane and comprising a thermochromic material;
    a plurality of carbon nanofiber structures between the message film and the thermochromic layer and in contact with the thermochromic layer, the plurality of carbon nanofiber structures comprising a plurality of carbon nanofiber yarns that are infiltrated with conductive microparticles or conductive nanoparticles; and
    an electrode oriented in the same plane as the thermochromic layer, and
    wherein the electrode is in contact with at least one of the plurality of carbon nanofiber structures.

2. The apparatus of claim 1, wherein the thermochromic layer comprises liquid crystal polymer.

3. The apparatus of claim 1, wherein the thermochromic layer comprises a leuco dye.

4. The apparatus of claim 1, wherein the plurality of carbon nanofiber yarns comprises an array of linearly arranged carbon nanofibers yarns.

5. The apparatus of claim 4, further comprising at least one of the plurality of carbon nanofiber yarns being in electrical contact with each carbon nanofiber yarn of the array of linearly arranged carbon nanofibers yarns.

6. The apparatus of claim 1, wherein the array of linearly arranged carbon nanofibers is defined by a grid of transversely arranged carbon nanofiber yarns.

7. The apparatus of claim 6, wherein a pitch between adjacent carbon nanofiber yarns is from 100 μm to 1 mm.

8. The apparatus of claim 1, wherein a thermal conductivity of the plurality of carbon nanofiber structures transports heat from a heat source to the thermochromic layer in less than 100 milliseconds.

9. The apparatus of claim 1, further comprising:
    an adhesive layer on a side of the message film opposite the plurality of carbon nanofiber structures; and
    a release liner on the adhesive layer.

10. An apparatus, comprising:
a backing film comprising a substrate;
a thermochromic layer oriented in a plane and comprising a thermochromic material;
a plurality of carbon nanofiber structures between the backing film and the thermochromic layer and in contact with the thermochromic layer, the plurality of carbon nanofiber structures comprising a plurality of carbon nanofiber yarns that are infiltrated with conductive microparticles or conductive nanoparticles; and
an electrode oriented in the same plane as the thermochromic layer, and
wherein the electrode is in contact with at least one of the plurality of carbon nanofiber structures.

11. The apparatus of claim 10, wherein the thermochromic layer comprises liquid crystal polymer.

12. The apparatus of claim 10, wherein the thermochromic layer comprises a leuco dye.

13. The apparatus of claim 10, wherein the plurality of carbon nanofiber yarns comprises an array of linearly arranged carbon nanofibers yarns.

14. The apparatus of claim 13, further comprising at least one of the plurality of carbon nanofiber yarns being in electrical contact with each carbon nanofiber yarn of the array of linearly arranged carbon nanofibers yarns.

15. The apparatus of claim 10, wherein the array of linearly arranged carbon nanofibers is defined by a grid of transversely arranged carbon nanofiber yarns.

16. The apparatus of claim 15, wherein a pitch between adjacent carbon nanofiber structures of the plurality is from 100 μm to 1 mm.

17. The apparatus of claim 10, wherein a thermal conductivity of the plurality of carbon nanofiber structures transports heat from a heat source to the thermochromic layer in less than 100 milliseconds.

18. The apparatus of claim 10, further comprising:
an adhesive layer on a side of the backing film opposite the plurality of carbon nanofiber structures; and
a release liner on the adhesive layer.

19. The apparatus of claim 1, further comprising the plurality of carbon nanofiber yarns being infiltrated with silver nanoparticles having a length of approximately 200 nm so as to facilitate transmission of thermal energy from a heat source to the thermochromic layer.

20. The apparatus of claim 1, further comprising the plurality of carbon nanofiber yarns being infiltrated with tungsten nanoparticles having a diameter of 100 nm to 500 nm so as to generate heat from the electrical resistivity and transmit the heat to the thermochromic layer.

21. The apparatus of claim 10, further comprising the plurality of carbon nanofiber yarns being infiltrated with silver nanoparticles having a length of approximately 200 nm so as to facilitate transmission of thermal energy from a heat source to the thermochromic layer.

22. The apparatus of claim 10, further comprising the plurality of carbon nanofiber yarns being infiltrated with tungsten nanoparticles having a diameter of 100 nm to 500 nm so as to generate heat from the electrical resistivity and transmit the heat to the thermochromic layer.

* * * * *